United States Patent Office 2,856,383
Patented Oct. 14, 1958

2,856,383

LINEAR POLYESTER COMPOSITIONS CONTAINING A 2,4,5-TRIHYDROXY PHENONE OF A FATTY ACID AS A HEAT STABILIZER

M B Knowles and Louis D. Moore, Jr., Kingsport, Tenn., assignors to Eastman Kodak Company, Rochester, N. Y., a corporation of New Jersey No Drawing. Application September 24, 1956
Serial No. 611,782

4 Claims. (Cl. 260—45.95)

This invention relates to the heat stabilization of synthetic linear polyesters of high molecular weight. Linear polyesters are extensively used in textile fibers, which are subject to heating in the processes of washing, drying at elevated temperatures, ironing and pressing. Linear polyesters are also used in films and shaped articles which are subjected to heating in their various uses, such as in electrical insulation and the like. Heating tends to degrade linear polyesters, as has been discussed by H. A. Pohl in Journal of the American Chemical Society, 73, 5660–5661 (1951), and by I. Marshall and A. Todd in Transactions of the Faraday Society, 49, 67–78 (1953).

When polyesters are heated at elevated temperatures, they degrade in physical properties and in molecular weight as measured by the logarithmic viscosity number, $\{\eta\}$, defined by the equation $$\{\eta\} = \frac{\ln(\eta/\eta_0)}{C}$$

where $\eta_0$ and $\eta$ are the viscosities respectively of pure solvent and of a solution containing C grams of polymer per 100 cc. of solvent. The logarithmic viscosity numbers reported herein were measured in a 60:40 mixture by weight of phenol:tetrachloroethane at a polymer concentration of about 0.23 gram/100 cc.

In the course of our investigation of the thermal breakdown of linear polyesters, we have found that the addition of certain compounds to the polyesters retards thermal degradation. The mechanism of this protection is not completely understood, but it has been shown that oxygen has a detrimental effect; therefore, the compounds may be functioning as antioxidants. However, we have found that a great many antioxidants are not stabilizers for linear polyesters.

We have found that linear polyesters can be heat stabilized by the incorporation of a small proportion of a 2,4,5-trihydroxyphenone of a fatty acid, having the formula

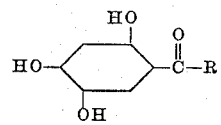

in which R is an alkyl group of from 3 to 17 carbon atoms.

The 2,4,5-trihydroxyphenone of a fatty acid can be incorporated into the resin either by mixing it into the molten resin, which may then be extruded or molded, or by adding it to a solution or dope of the resin, which may then be cast as a film or spun as a filament. Concentrations of from 0.1 to 10 parts by weight of the 2,4,5-trihydroxyphenone of a fatty acid per 100 parts by weight of linear polyester may be used; we prefer to use from 0.3 to 3 parts per 100 parts of polyester.

The effectiveness of the stabilizer was tested by placing film strips of the polyester containing the stabilizer in a 200° C. air oven for a given length of time. The values of $\{\eta\}$ were determined before and after the heating. A comparison of these figures with those obtained on a blank of the same batch of polyester provided a measure of the stabilizing effect of the additive.

In the examples given below, 2,4,5-trihydroxyphenones of fatty acids were incorporated in the indicated proportions with a linear polyester designated as 5:1:6–S:A:P, made from a 5:1:6 mole ratio of 4,4'-dicarboxyphenyl sulfone, HOOC—$C_6H_4$.$SO_2$.$C_6H_4$—COOH:succinic acid: 1,5-pentanediol, with a linear polyester designated as 3:2:5–C:S:B, made from a 3:2:5 mole ratio of azelaic acid:4,4'-dicarboxyphenyl sulfone:1,4-butanediol, and with a linear polyester designated as 3:2:5–T:B:H, made from a 3:2:5 mole ratio of terephthalic acid:sebacic acid: cyclohexane-1,4-dimethanol. Cyclohexane-1,4-dimethanol has the formula HO.$CH_2$.$C_6H_{10}$.$CH_2$.OH.

| Examples | Parts Stabilizer per 100 Parts Polyester | Polyester | $\{\eta\}$ | | |
|---|---|---|---|---|---|
| | | | Original | After 15 hrs. | After 63 hrs. |
| 1 | 1 of 2,4,5-trihydroxy-stearophenone | 5:1:6–S:A:P | 0.69 | 0.70 | |
| | None | Same | 0.70 | 0.34 | |
| 2 | 1 of 2,4,5-trihydroxy-butyrophenone | 3:2:5–C:S:B | 1.03 | 0.97 | Insoluble. |
| | None | Same | 1.11 | Insoluble | Do. |
| 3 | 1 of 2,4,5-trihydroxy-stearophenone | 3:2:5–C:S:B | 1.00 | 0.99 | Do. |
| | None | Same | 1.11 | Insoluble | Do. |
| 4 | 1 of 2,4,5-trihydroxy-stearophenone | 3:2:5–T:B:H | 1.07 | 1.31 | 0.34. |
| | None | Same | 1.08 | 0.35 | 0.12. |
| 5 | 1 of 2,4,5-trihydroxy-butyrophenone | 3:2:5–T:B:H | 1.11 | 0.81 | 0.14. |
| | None | Same | 1.08 | 0.35 | 0.12. |

Insolubility of a sample after heating indicates that considerable degradation has taken place during the heating.

What we claim as our invention and desire to be secured by Letters Patent of the United States is:

1. A polyester composition comprising a linear polyester of a dihydric alcohol with two dicarboxylic acids, stabilized against degradation by heat by a content of from 0.1 to 10 parts by weight of a 2,4,5-trihydroxyphenone of a fatty acid, having the formula

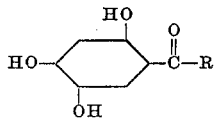

in which R is an alkyl group of from 3 to 17 carbon atoms, per 100 parts by weight of polyester.

2. A polyester composition comprising a linear polyester of a dihydric alcohol with two dicarboxylic acids, stabilized against degradation by heat by a content of from 0.3 to 3 parts by weight of a 2,4,5-trihydroxyphenone of a fatty acid, having the formula

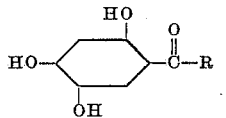

in which R is an alkyl group of from 3 to 17 carbon atoms, per 100 parts by weight of polyester.

3. A polyester composition comprising a linear polyester of a dihydric alcohol with two dicarboxylic acids, stabilized against degradation by heat by a content of from 0.3 to 3 parts by weight of 2,4,5-trihydroxy-butyrophenone per 100 parts by weight of polyester.

4. A polyester composition comprising a linear polyester of a dihydric alcohol with two dicarboxylic acids, stabilized against degradation by heat by a content of from 0.3 to 3 parts by weight of 2,4,5-trihydroxy-stearophenone per 100 parts by weight of polyester.

References Cited in the file of this patent

UNITED STATES PATENTS 2,759,828  Bell et al. _____ Aug. 21, 1956

FOREIGN PATENTS 401,018  Great Britain _____ Nov. 9, 1933
1,110,532  France _____ Feb. 14, 1956

OTHER REFERENCES

Bergel: Chemistry and Industry, April 1, 1944, pages 127 and 128.